(12) United States Patent
Holenstein et al.

(10) Patent No.: US 7,603,389 B2
(45) Date of Patent: Oct. 13, 2009

(54) OPTIMIZED STATEMENT CACHING FOR TRANSACTION REPLAY

(75) Inventors: Bruce D. Holenstein, Media, PA (US); Paul J. Holenstein, Downingtown, PA (US); Gary E. Strickler, Pottstown, PA (US); William A. Grimm, Coatesville, PA (US); Wilbur H. Highleyman, Blairstown, NJ (US)

(73) Assignee: Gravic, Inc., Malvern, PA (US)

( * ) Notice: Subject to any disclaimer, the term of this patent is extended or adjusted under 35 U.S.C. 154(b) by 0 days.

(21) Appl. No.: 11/368,268

(22) Filed: Mar. 3, 2006

(65) Prior Publication Data

US 2006/0200507 A1    Sep. 7, 2006

Related U.S. Application Data

(60) Provisional application No. 60/658,636, filed on Mar. 4, 2005.

(51) Int. Cl.
*G06F 12/00* (2006.01)
(52) U.S. Cl. ........................ 707/201; 707/202; 707/203; 707/204; 707/205
(58) Field of Classification Search .................... 707/3, 707/100, 2, 1, 4, 5, 101, 102, 103, 201, 202
See application file for complete search history.

(56) References Cited

U.S. PATENT DOCUMENTS

| 6,115,703 | A  | * | 9/2000  | Bireley et al. ................... 707/2 |
| 6,122,630 | A  |   | 9/2000  | Strickler et al. |
| 6,321,235 | B1 | * | 11/2001 | Bird ........................... 707/203 |
| 6,598,058 | B2 | * | 7/2003  | Bird et al. .................... 707/201 |
| 6,615,214 | B1 | * | 9/2003  | Bird et al. .................... 707/100 |
| 6,662,196 | B2 |   | 12/2003 | Holenstein et al. |
| 6,745,209 | B2 |   | 6/2004  | Holenstein et al. |
| 2005/0021567 | A1 |   | 1/2005 | Holenstein et al. |
| 2005/0060285 | A1 | * | 3/2005 | Barsness et al. ................. 707/2 |

OTHER PUBLICATIONS

Lindsay, B., Proceedings of the 21st VLDB Conference, Zurich, Switzerland, pp. 694-695, 1995.*
Oracle Corporation, Oracle9i JDBC Developer's Guide and Reference Release 2 (9.2), pp. 1-9, 2002.*
W.H. Highleyman et al. "Breaking the Availability Barrier; Survivable Systems for Enterprise Computing," AuthorHouse; Dec. 2003, 393 pages.

* cited by examiner

*Primary Examiner*—Cheyne D Ly
(74) *Attorney, Agent, or Firm*—Panitch Schwarze Belisario & Nadel LLP

(57) ABSTRACT

Transactions are replicated from a source database to a target database in a data replication system. The system includes a first memory location that persistently stores statement text associated with transactions to be replicated. Transactions to be replicated are cached by separating the transactions into statement text and statement data. A determination is made as to whether the statement text has been previously stored in the first memory location. If not, then the statement text is persistently stored to the first memory location. A similar scheme is provided for replicating I/O operations.

14 Claims, 3 Drawing Sheets

SQL Statement Text and Statement Data Caching in a Statement Cache

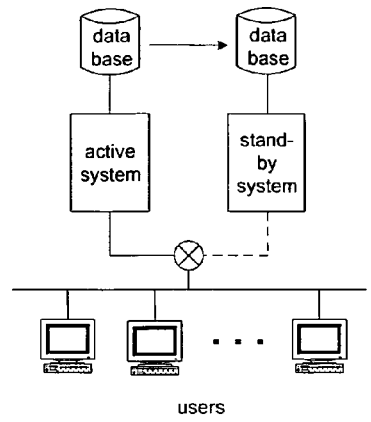
Active/Standby
Figure 1(a) -- Multi-Node System
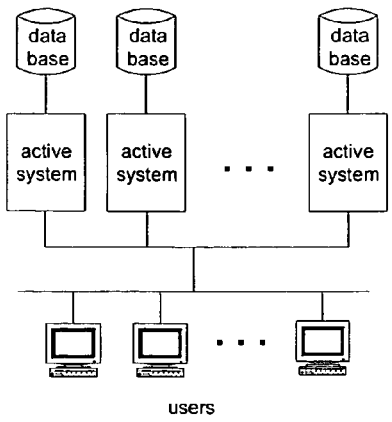
Stateless Active/Active
Figure 1(b) -- Multi-Node System
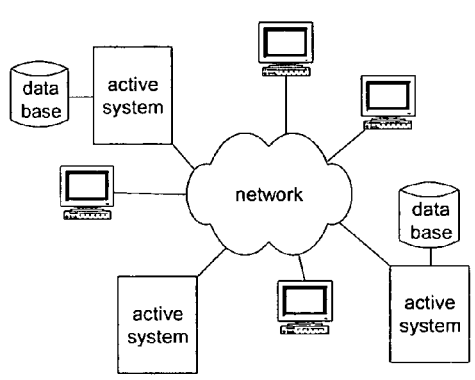
Stateful Active/Active
with Direct Attached Storage
Figure 1(c) -- Multi-Node System
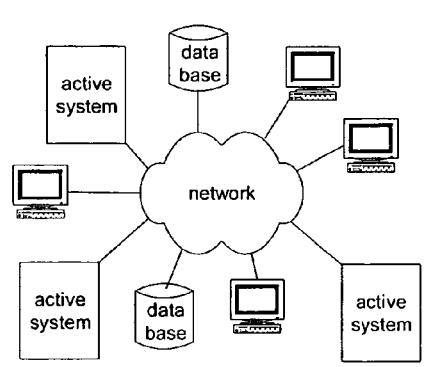
Stateful Active/Active
with Network Attached Storage
Figure 1(d) -- Multi-Node System

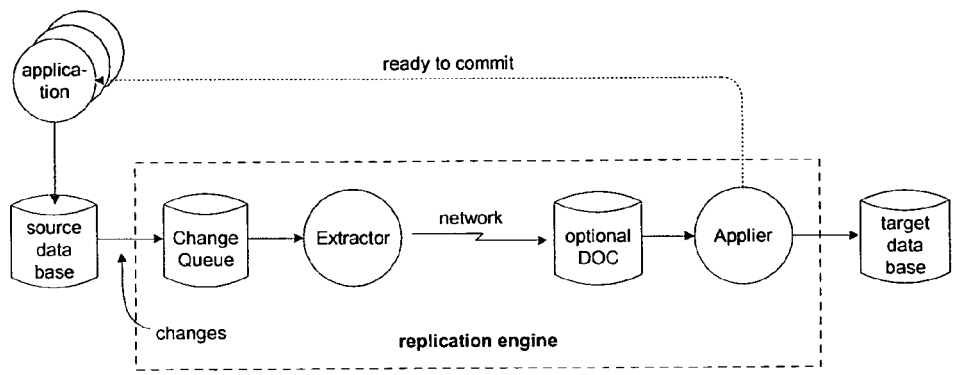
Figure 2 - Sample Data Replication Engine (Prior Art)
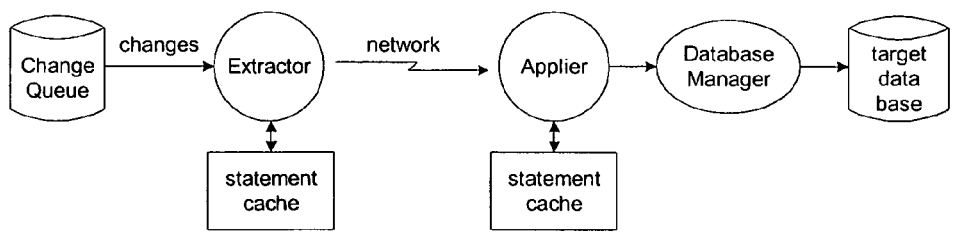
Figure 3 - SQL Statement Text and Statement Data Caching in a Statement Cache

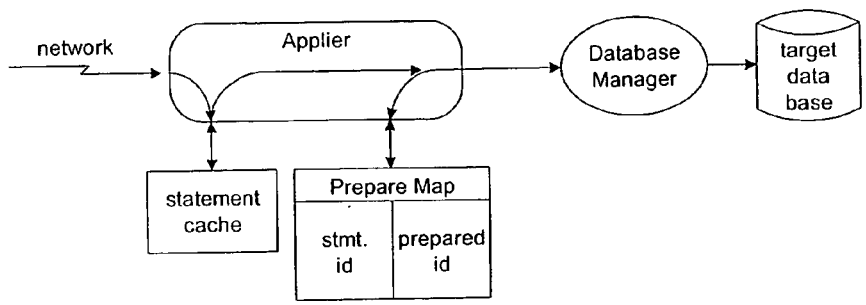
Figure 4 - Prepared Statement Caching
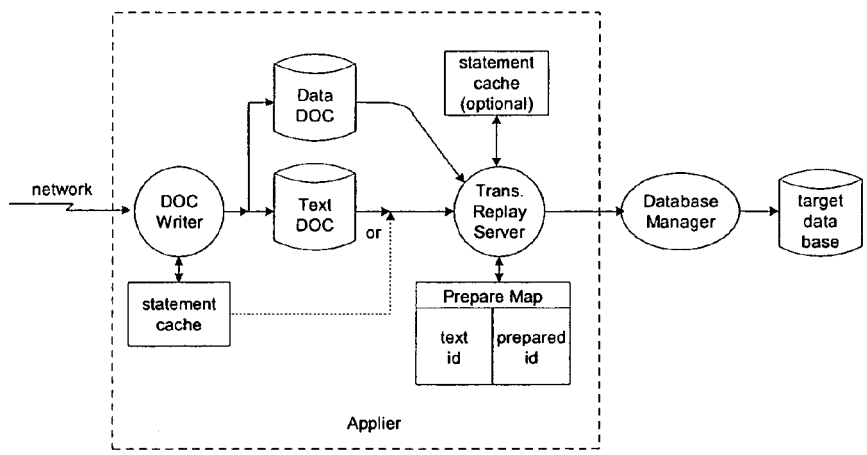
Figure 5 - Database of Change (DOC) with Statement Data and Statement Text Caches
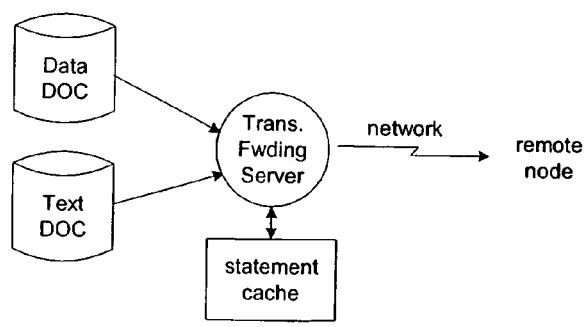
Figure 6 - Transaction Forwarding Server (Accessing Statement Text and Statement Data Caches)

OPTIMIZED STATEMENT CACHING FOR TRANSACTION REPLAY

CROSS-REFERENCE TO RELATED APPLICATION

This application claims the benefit of U.S. Provisional Patent Application No. 60/658,636 filed Mar. 4, 2005.

BACKGROUND OF THE INVENTION

Many of today's computing applications require extreme reliability. The requirement for average failure intervals measured in centuries is not uncommon. The solution of choice in today's art to achieve such reliability is to build systems with redundant components so that the functions of a failed component can be assumed by a surviving component.

In many cases, redundancy is provided at the system level. Two or more functioning systems are provided as nodes in an application network. If one node fails, its services can be provided by another node.

A major issue with these systems is that two or more databases must be provided across the application network so that, if a database is lost, the network still has access to the current application data. These databases must be kept in synchronism. That is, when a change is made to one database, it must be reflected in all database copies across the network (the database copies need not be exact replicas of each other; for instance, the data may be in different formats, or the data may be transformed or filtered differently by different database copies).

Database synchronization is often provided by data replication. When a change is made to one database, that change is sent to the other database copies in the network.

An important issue with data replication is replication latency. There is a time delay between the time that a change is applied to one database and then subsequently replicated to the other databases. Not only does this time delay give a different view of the application state to users at different nodes at any specific point in time, but more importantly it can lead to data loss and data collisions. That is, if a node fails, any changes in its replication pipeline may be lost. Furthermore, it is possible for two users at different nodes to update the same data at the same time—a data collision. The longer the replication latency, the greater the amount of data that may be lost following a failure and the more likely it is that data collisions will occur.

Statement Caching is a method that can significantly reduce the replication latency of a data replication engine, thus reducing to a great extent inconsistent views, data loss, and data collisions in multi-nodal computing systems. It does this by intelligently caching database change statements (the statement text portion as described below) so that each needs only be sent once. Thereafter, only the statement data required by a database change statement need be sent.

In prior art replication engines, the statement caching information was not persistent—the caches started out empty each time replication engine began replicating (e.g., after a restart). This caused unnecessary data traffic to be sent as the caches need to be repopulated (with information that had already been sent) to the point where they were when the last replication engine shutdown occurred. There is a need in the art to combine persistent storage of the statement text and/or statement data to the statement caching architecture to make the replicator more efficient and to lessen replication latency. The present invention fulfills such a need.

BRIEF SUMMARY OF THE INVENTION

In one preferred embodiment of the present invention, transactions are replicated from a source database to a target database in a data replication system. The system includes a first memory location that persistently stores statement text associated with transactions to be replicated. Transactions to be replicated are cached by separating the transactions into statement text and statement data. A determination is made as to whether the statement text has been previously stored in the first memory location. If not, then the statement text is persistently stored to the first memory location.

In another preferred embodiment of the present invention, I/O operations are replicated from a source database to a target database in a data replication system. The system includes a first memory location that persistently stores statement text associated with I/O operations to be replicated. I/O operations to be replicated are cached by separating the transactions into statement text and statement data. A determination is made as to whether the statement text has been previously stored in the first memory location. If not, then the statement text is persistently stored to the first memory location.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

FIG. 1 shows prior art multi-node systems.

FIG. 2 shows a sample prior art data replication engine.

FIG. 3 shows SQL Statement Text and Statement Data Caching in a Statement Cache.

FIG. 4 shows Prepared Statement Caching.

FIG. 5 shows Database of Change (DOC) with Statement Data and Statement Text Caches.

FIG. 6 shows Transaction Forwarding Server (Accessing Statement Text and Statement Data Caches).

DETAILED DESCRIPTION OF THE INVENTION

Certain terminology is used herein for convenience only and is not to be taken as a limitation on the present invention.

TABLE OF CONTENTS

I. Background
  A. The Need for High Reliability
  B. Redundant Systems
  C. Multi-Node Systems
  i. Active/Standby Systems
  ii. Stateless Active/Active Systems
  iii. Stateful Active/Active Systems
  iv. Advantages of Active/Active Systems
  D. Database Synchronization
  i. Data Replication
  ii. Synchronous Replication
  iii. Asynchronous Replication
  iv. Replication Latency E. The Replication Engine
  i. Architecture
  ii. Transaction Steps and Procedural, or Operation-Oriented, Replication
  iii. Non-audited Replication Environments
  iv. Synchronous Replication
  v. Multi-Threading
  vi. Bi-Directional Replication
  vii. Heterogeneity
F. Minimizing Replication Latency
G. Statement Caching (Introduction)

II. Statement Caching
  A. Current Methods for Database Replication
  B. The Problems That Statement Caching Solves
  C. SQL Statement Text Caching
    i. Extractor
    ii. Applier
    iii. Cached Statements
    iv. Hashing
    v. Cache Depth Limitations
    vi. User Exit Cache
  D. Multi-Threading and Referential Integrity
  E. Prepared Statement Caching
  F. Caching with Database of Change (DOC) Store
  G. Static SQL Statements
  H. Blocking Changes
  I. Blocking Transaction Events
  J. Transaction Forwarding Server (TFS)
  K. Recovery
  L. Improvements Using Statement Caching III. References I. Background
  A. The Need for High Reliability There are many applications in which the loss of computing services can be unacceptably expensive. Examples of these are:
1. The failure of a 911 system for even a few minutes could result in loss of life or property.
2. The failure of an on-line store could result in loss of customers as they switch to other web sites.
3. The failure of a stock exchange system which results in lost trades can invalidate the day's trading thereafter.

For systems such as these, failure intervals measured in decades or even centuries are often required. Furthermore, when a system does fail, it often must be recovered in seconds.

B. Redundant Systems

The general solution for high reliability requirements is redundancy. Every component of a system is duplicated and arranged in such a way that if a component fails, a similar component can assume its functions. In some cases, a component is backed up by a spare component which is dormant until called upon to replace a failed component. In other cases, the redundant components are in a shared pool of two or more and all are available to process requests. If a component fails, the size of the shared pool is simply reduced by one, but the system continues to operate.

Hewlett-Packard's NonStop servers are a contemporary example of redundancy by pooled resources. A NonStop server comprises multiple processors, dual disk systems, pools of application software modules, dual power supplies, dual fans, dual interconnecting networks, and so on. (In certain cases, critical software modules are backed up by dormant spares.) If any component fails, its pool is simply reduced by one and the remaining component(s) assume the functions of the failed component.

For instance, a typical NonStop server might have sixteen processors and dual (mirrored) disks. If a processor fails, the remaining fifteen processors assume the processing load. If a disk unit fails, its mirror continues to provide access to application data.

Field experience indicates that HP's NonStop servers have average failure intervals in the order of five to ten years. These are certainly highly reliable systems but do not meet the decades-to-centuries requirements of many applications today.

To meet these requirements of extreme reliability, system architects often invoke multi-node systems.

C. Multi-Node Systems

A multi-node system is one comprising two or more computing systems, each capable of providing all (or those deemed critical) application services to the users of the applications (users may be people or other applications). Each node is capable of supporting part or all of the total user activity.

There are several configurations for multi-node systems in use today. Some of these are shown in FIG. 1.

i. Active/Standby Systems

In an active/standby configuration (FIG. 1(a)), one system (the active system) supports the entire user base. It is backed up by one or more spare systems (the standby systems), any of which can take over and become the active system if the original active system fails.

Following a failure of the active system, the database at a standby system must be brought up-to-date, reflecting all user activity up to the point of the active system's failure, before that standby system can take over the active role. The standby database(s) may be kept up to date in near-real-time or may be reconstructed following the active system's failure before being put into service.

A limitation of active/standby systems is that twice the capacity required must be purchased. Furthermore, switchover to the standby system in the event of a primary failure often takes hours. These problems are solved by active/active systems in which all systems cooperate to actively process user requests.

ii. Stateless Active/Active Systems

In some applications, the response to a user's request is independent of any past history. No information is saved in the system as a result of user activity, and the state of the system remains unchanged. This is known as a stateless system.

An example of a stateless system is a web page server. The system delivers prestored, static pages to a user's browser upon request.

Such a system can be implemented as a pool of server systems as shown in FIG. 1(b). All systems are actively supporting user requests. Since all systems are active and independent of the others, this is known as a stateless active/active system.

When a user makes a request, his request is routed to some server in the pool according to some routing algorithm (such as to the server with the fewest requests waiting for service or the server that is geographically closest). If a server fails, it is simply removed from the pool and the remaining servers assume the load.

iii. Stateful Active/Active Systems

The most general form of application is a transaction processing application in which each user interaction can change the state of the system. That is, it can change data in the system's database. A system providing such services is known as a stateful system since it must provide a consistent user state, typically via a database, providing a common view to all users. Note that the database may be resident on a persistent medium such as disk, or may be contained in non-persistent memory.

A multi-node stateful system comprises two or more nodes, each of which can provide application services to a subset of the user community. Because all nodes are actively participating in the application, these systems are known as stateful active/active systems.

In order to maintain extreme reliability, there must be two or more copies of the database in the application network so that access to the database can be provided to all users in the presence of any single failure. These databases must be kept in synchronism in that changes made to any one database must be reflected in the others.

Two examples of stateful active/active systems are shown in FIG. 1(c and d). They differ only in the arrangement of their redundant databases. Each comprises two or more fully functional nodes, each capable of providing full (or the critical) application services to a subset of users. Each node has access to the application's database either locally or across the network.

FIG. 1(c) shows an active/active system with direct attached storage. In this architecture, two or more nodes have a directly attached database. Applications at these nodes can access data from their local database. Applications at other nodes which do not have a database, or applications at nodes with a failed database, can access data across the network by issuing requests to a node with an operable database.

FIG. 1(d) shows an active/active system with network attached storage. At least two copies of the database are provided in the network. Any node in the-application network has access to the redundant database. If one copy of the database fails, the other database(s) remain available to all applications.

In either architecture, the users of the application are often connected to the nodes by a network suitable for switching them from one node to another in a very short time (e.g., sub-second to seconds). If the node to which a user is connected fails, then that user can be reconnected to a surviving node and continue to receive full application services. The newly configured node(s) will now be carrying additional load and non-critical services may have to be jettisoned (i.e., load shedding), but all users will continue to receive all critical services.

iv. Advantages of Active/Active Systems

The descriptions that follow apply to active/active systems. Among the advantages of active/active systems are the following.

a) All purchased capacity is available to support the users of the application.
b) The system is easily scalable by adding additional nodes.
c) An active/active system can survive the failure of one or more nodes and still continue to service the user community within the capacity of the surviving nodes.
d) If the failure of a single node is acceptable from a capacity viewpoint, then the interval of failure of two or more nodes that may render the system unusable can be measured in decades to centuries (see reference 1).
e) Full capacity over periods of decades to centuries can be obtained by providing one additional node. Thus, if one node fails, the full required capacity is still available to the user community. For instance, if four nodes would provide sufficient capacity, a fifth node is added. The addition of partial capacity (25% in this case) to achieve extreme reliability compares favorably to the requirement to add 100% of capacity in an active/standby architecture to achieve the same result.
f) Nodes in an active/active system can be taken down for upgrading or maintenance without denying service to users by switching users from the downed node to surviving nodes. The upgraded or repaired node can then be returned to service, its database can be resynchronized (if necessary), and its users reconnected. This technique can be used to completely eliminate planned system outages.

D. Database Synchronization i. Data Replication

It is important that any user connected to any node sees the same (or at least a consistent) application state as any other user at any other node. Since these users may be accessing different databases, in many cases it is important that these databases be similar copies of each other. That is, all of the databases in the application network must be synchronized.

The movement of a data item or state change from the source of change (the source database) to the other databases (target databases) in the network is known as data replication.

ii. Synchronous Replication

Ideally, any user will see exactly the same data as any other user at any given point in time. Since it takes some time to update all of the copies of a data item throughout the network, this generally requires that:

a. All copies of a particular data item in the application network that is about to be changed be hidden from the view of all users (or, alternatively, be hidden from view as the changes are made to it).

b. The view of this data item is not returned to the users until all copies of that data item in the network have been changed (or, alternatively, the previous view of this data item that was consistent is returned until all copies of that data item in the network have been changed).

If data replication results in the same view to any user at any specific time, then this is known as synchronous replication. Put another way, synchronous replication guarantees that all of the changes are made to all database copies or that none are, under the context of a global ACID (atomic, consistent, isolated, durable) operation.

Although other techniques exist, these requirements are generally met by locking each copy of the data item across the network before changing that copy. These locks are then held until it is guaranteed that all data items can be successfully changed.

Among the techniques for synchronous replication are (see Chapter 4 in reference 1 and also reference 3):

1. Network transactions, in which the scope of the transaction includes all copies of data items to be changed across the network.
2. Coordinated Commits, in which asynchronous replication (to be described next) is used to propagate changes from the source system to the target systems, but the commit of these changes to their respective databases is coordinated such that all databases provide the identical view of the data to all users at any specific point in time.

Synchronous replication techniques guarantee absolutely consistent views of the data across the network, but impose a performance penalty in that the application must wait for all databases in the network to agree to commit before it can report transaction completion to the originating user. This delay is known as application latency.

Application latency is particularly an issue with network transactions since each update is generally sent individually to each database copy (either in parallel or serially). Especially in the case of widely dispersed nodes where signal propagation time is significant (approximately a 50 millisecond roundtrip time for an update and response from New York to Los Angeles), application latency can be a predominant factor of response times for systems using network transactions.

Coordinated commits largely solve this problem by sending changes in batches to the target system(s) asynchronously with respect to the source application itself. The source application must wait only for the final ready to commit tokens to be exchanged.

iii. Asynchronous Replication

In many applications, the need to have the application databases exactly synchronized can be relaxed. A small delay (sub-second to a few seconds) from the time that a change is made to one database to the time that it appears in the other databases is acceptable. This delay is known as replication latency.

The tolerance by an application for some degree of replication latency allows changes to be replicated independently of the application. The application is unaware of the replication process, and application latency is reduced to zero.

This form of replication is known as asynchronous replication (see Chapter 3 in reference 1). Asynchronous replication eliminates the application latency inherent in synchronous replication, but at a price of potential data loss or the occurrence of data collisions due to replication latency.

iv. Replication Latency

Though replication latency may be acceptable in many applications, it raises several issues:
1. Consistent Views: Any two users may obtain different results from different copies of the database at the same time.
2. Lost Data: If a node or network fails, changes in the replication pipeline may be lost and may not be recoverable.
3. Data Collisions: Two users at different nodes might update the same data item at nearly the same time. Each node would replicate its change to the other node that would overwrite the original change. The data item would have different values at each node, and each is wrong.

Current data replication engines provide replication latencies from subsecond to several seconds. It is important to minimize replication latency in systems using asynchronous replication to minimize inconsistent views, lost changes following a failure, and data collisions. It is important to minimize replication latency in systems using synchronous replication to minimize application latency.

E. The Replication Engine

For background purposes, a sample replication engine is described below. U.S. Pat. No. 6,122,630 (Strickler et al.), U.S. Pat. No. 6,662,196 (Holenstein et al.), of which are incorporated by reference herein, further define such an engine and describe additional replication engine architectures.

i. Architecture

A typical replication engine architecture is shown in FIG. 2. It comprises the following components:
1. Change Queue: The Change Queue contains a record of all changes made to the source database. It may take one of many forms:
   a. the redo log (or audit trail) maintained by the source system's transaction manager.
   b. a change log maintained by the application.
   c. a change log maintained by the replication engine, in which changes are obtained, for instance, by intercept libraries inserted into the application or by triggers inserted into the source database.

In most cases, the Change Queue is persistent (e.g., disk based) to protect changes in the event of a failure.
2. Extractor: The Extractor extracts changes (individually or in bulk) from the Change Queue and sends them to the target node(s).
3. Network: The network is used to send changes (either individually or in bulk) from the source node to the target node(s).
4. Database of Change: In some replication engines, incoming changes at the target node are first stored in a persistent store (typically disk and called a Database of Change, or DOC) to support recovery and to help in organizing the flow of changes to the target database. In other implementations, changes are sent directly to the Applier. There is no DOC in these cases.
5. Applier: The Applier receives changes from the DOC or directly from the Extractor over the network. It organizes changes into the proper order (if needed) and applies them to the target database.
6. Ready-to-Commit: This is one method that can be used to implement synchronous replication, see reference 3 for more information.

There are many forms of replication engines that are variants of this architecture, and indeed the replication engine can be broken up into a source replication engine and a target replication engine. For instance, there may be a source-side DOC, the Applier may be on the source node, the Extractor may be on the target node, the Extractor and Applier may be combined and be on either side of the network, and so forth.

ii. Transaction Steps and Procedural, or Operation-Oriented, Replication

Replication environments normally replicate the events that change the source database and apply them to the target database. Depending on the replication engine architecture, this same approach holds for the transactions that contain the transaction events or steps.

Throughout this document, whenever replicating events or transactions are discussed, it also refers to replication environments that replicate procedures or operations (a procedure is a command sequence such as DELETE ALL ROWS or UPDATE ACCOUNT_BAL BY 10% WHERE TITLE="Manager"). I.e., instead of replicating the individual event records/rows that changed, replicate the operations instead.

An alternative embodiment would replicate these procedures in addition to or instead of the events and/or transactions.

iii. Non-Audited Replication Environments

The present invention is meant to include both "audited" and "non-audited" databases. Audited databases support transactional integrity. That is, a set of I/O operations (e.g., transaction steps) is either fully committed, or fully backed out, based on the success or failure of the transaction. Audited databases typically provide a transaction "redo" log that can often be read by the replication engine for transaction I/O order and/or for grouping the I/O operations into transactions.

In a non-audited database system, the collection of the I/O operations (that change the database) must be managed and made available to the replication engine (usually via one of the approaches described previously for generating the Change Queue data). In this environment, the replication engine must treat all individual, successful database change I/O operations as if they consist of a begin (implicit), database I/O operation, and a commit (implicit). Certain unsuccessful database I/O's are also treated as if they were successful, for example if the base table was updated successfully, yet an index path failure occurred (as the file system would allow the base table/index inconsistency to remain).

iv. Synchronous Replication

As mentioned previously, one method for synchronous replication is coordinated commits. The coordinated commit method uses an asynchronous data replication engine to send changes enclosed within the scope of a transaction to the target node without application impact (see reference 1 and reference 3). As each change is received, a lock is placed on the associated data item at the target node so that it cannot be updated by any other entity, and to hide it from any user inquiry. The change may also be made at this time.

When all changes for the transaction have been sent, the source node will then send a "Ready to Commit?" query to the target node(s) asking if they are ready to commit. If a target node has successfully acquired locks on all of the data items to be changed, then it will reply "Ready to Commit." When the source node has received affirmative replies from each target node, it will issue commit commands to all nodes telling them to apply the changes and release their locks.

The source application is unaffected by the coordinated commit process until it is time to commit the transaction. It must then wait for Ready to Commit tokens to be exchanged before it can declare the transaction finished. This is the application latency referred to earlier.

v. Multi-Threading

The capacity of a replication engine may be significantly increased and its replication latency reduced by multi-threading some or all of its components:

a. Multiple Extractors could be employed to increase the reading rate of the Change queue.

b. Multiple communication channels could be configured to speed the transfer of changes from the source node to a target node.

c. Multiple Appliers could be used to increase the read rate of the DOC (if any) and the update rate of the target database.

Many data replication engines support multi-threading. A significant issue with multi-threaded replication engines is referential integrity (see Chapter 10 in reference 1 and reference 5). If changes are being sent to a target node over independent threads, then there is generally no guarantee that changes will be applied at the target node in the same order that they were sent from the source node, or that they will be applied in such a way so as to preserve the integrity of the original transaction steps and/or operations, both intra transaction and inter transaction.

However, it is important in many cases that changes be applied to the target database in the same order that they were applied to the source database. Otherwise, newer changes may be overwritten by older changes, or references may be made to other data items that do not yet exist.

Therefore, it is generally imperative that a multi-threaded replication engine provide a re-serialization facility following the last multi-threaded path to sequence changes and transactions in the proper order.

vi. Bi-Directional Replication

Bi-directional replication is of course needed for active/active systems. This is generally provided by configuring two data replication engines, each replicating in the opposite direction. Certain capabilities are required of a replication engine in order for it to be able to be used in a bi-directional mode, such as-being able to prevent the ping-ponging of changes from the source system to the target system and back again (see reference 2).

vii. Heterogeneity

The data replication engine is typically loosely coupled. That is, the source node does not need to know how the target node processes data, nor does the target node need to have any knowledge of what the source node does. All that is important is that they agree on how changes will be communicated.

Thus, there is no requirement that the source hardware, operating system or database system (e.g., database type, database structure, database catalog, etc.) be related in any way to those components on the target system. By using appropriate Extractors and Appliers, a MySQL database on a Linux system can be replicated to an Oracle database on a Sun system or to an Enscribe database on a NonStop server, for example.

The common interface supported by most databases is SQL, the Structured Query Language. SQL statements are used to insert, update, and delete data, among other actions, in these databases.

Therefore, a common technique for the source side of a replication engine to talk to its counterpart on the target side is via SQL statements or another definition language such as XML (throughout this document, these alternative approaches could replace the SQL statement approach described in the text). When using SQL format, the Extractor, for instance, would extract changes from its Change Queue and convert these to SQL statements. The SQL statements are sent to the target node which uses them to update its database.

Thus, the Extractor does not need to know what kind of Applier it is talking to, and vice versa. True heterogeneity is achieved.

However, as a transport language, SQL is quite verbose. In addition, a SQL statement needs to be compiled, or prepared, before it can be used—a time consuming and resource-intensive task. Therefore, a need exists for the Extractor and Applier to communicate with each other in a much more concise manner. As explained below in a preferred embodiment of the invention, this would entail exchanging the raw data and a modicum of control information.

F. Minimizing Replication Latency

As discussed earlier, it can be very important to minimize replication latency to reduce the possibility of inconsistent views, data loss, and data collisions. There are several opportunities to do this in a replication engine:

1. Minimize the number of disk queuing points (such as a DOC).

2. Block changes for efficient processing.

3. Read and write blocks of changes from and to disk instead of individual changes.

4. Block changes for efficient network utilization.

5. Compress data being sent over the network.

6. Use efficient re-serialization techniques.

G. Statement Caching (Introduction)

Statement Caching is a method for significantly reducing replication latency and increasing capacity in replicators which use SQL or a similar definition language as a transport language. Rather than sending an entire verbose SQL statement for each change over the network, the Extractor intelligently detects statements or statement structures which have been previously sent and sends only the data values along with a statement identifier.

The Applier maintains a cache of all (usually distinct) statements or statement structures which it has received and inserts data items sent by the Extractor into those statements. It then submits those statements (or an optimized representation thereof) to the database manager (DBM) or other appropriate facility for execution to effect a change to the target database.

SQL statements are generally compiled (prepared) before execution, which can be a costly process both in terms of time and system resources (i.e., statement preparation generally determines the approach to be used to execute the statement and defines the individual data types of the data items). For those databases which support it, Statement Caching will also cache prepared statements so that a statement needs to be prepared only once. Subsequently, only the data change items, along with the statement identifier, need be submitted to the DBM.

Thus, by minimizing the amount of data which must be sent and by caching prepared SQL statements, Statement Caching can significantly reduce replication latency as well as system resource utilization in database replication engines.

III. Statement Caching

A. Current Methods for Database Replication

In the previous section, "Background," a common method for supporting data replication between diverse databases has been described. In summary:

1. Changes to the source database are written to-a Change Queue.

2. One or more Extractors read these changes and create SQL statements for each change.

3. These SQL statements are sent over one or more communication channels to one or more Appliers.

4. The Appliers serialize these changes, prepare (compile) the statements, and use the prepared statements to apply the changes to the target database.

Typically, the SQL statements which are created, transmitted, and executed are known as Execute Immediate statements since, when they are received by the Applier, they are executed immediately. A typical "Execute Immediate" SQL statement is of the form:

INSERT INTO ACCOUNTTABLE (ACCTID, LASTNAME, FIRSTNAME, OPENDATE) VALUES (7324, 'SMITH', 'JACK', 2005-01-28)

This SQL statement begins with a verb (INSERT that specifies the action to be taken, i.e., insert a row). It then specifies the database table to be updated (ACCOUNTTABLE). Following this are the names for each column in the table to be updated (ACCTID, LASTNAME, FIRSTNAME, OPENDATE). Finally, the actual data values for the row to be inserted are provided.

This statement example requires about 107 bytes. Note that the actual data items represent a small part of this statement—less than 30 bytes in this example or less than 30% of the total. The data items will represent even a smaller proportion of the SQL statement if binary representations of the values are used.

B. The Problems That Statement Caching Solves

There are several problems with this approach so far as performance is concerned:

1. SQL statements are quite verbose and consume a good deal of communication bandwidth. It might take hundreds of bytes to send a few bytes of change data. With Statement Caching, a common statement called the statement text need be sent only once (in the previous example, the statement text includes all of the information except the data values).

2. The preparation of a SQL statement by the DBM (which generally consists of compiling the statement to generate an access path and an execution plan) can take a significant amount of time and consume significant system resources. Statement Caching caches previously prepared statements for reuse.

3. If a DOC is used, considerable time is required to write and read the full SQL statements. With Statement Caching, statement text is written only once. Thereafter, only the statement data along with a statement identifier need be written or read, and each database change occupies considerably less space on disk.

C. SQL Statement Text Caching

FIG. 3 shows one possible implementation of Statement Caching. It shows a basic replication engine with no Database of Change (DOC) storage unit.

i. Extractor

In this implementation, the Extractor reads changes that represent changes being made to the source database from the Change Queue. For each change, it determines the format of the SQL statement that is required to update the target database with this change.

The Extractor has available to it a statement cache which contains every statement that it has received or created to date. When it reads a change from the Change Queue (assuming the change queue does not deliver the information already in this format), it determines the SQL statement to be used for this change and searches its statement cache to see if the associated statement text has been previously sent:

1. If the statement is not found in the cache, then it is given a statement identifier and stored in the cache. The entire statement with its identifier, statement text, and the change data are sent to the Applier.

2. If the statement is found in the cache, then its statement identifier is obtained. The change data with only the statement identifier and not the statement text is sent to the Applier.

ii. Applier

The Applier also has a statement cache. When the Applier receives a statement with change data (including the statement text), it will store the statement and its identifier in its statement cache. It will then execute that statement to update the target database. Note that the Applier cache, the Extractor cache, and the prepared statement cache described later may all be different. For example, the Extractor cache might be limited to, say, 50 entries; the Applier cache might be unlimited; and the prepared cache might be limited to those statements compiled during the current database session. These differences typically become an exercise in proper mapping between the various caches.

If the Applier receives change data with only a statement identifier, then it will access the specified statement from its statement cache, and execute the statement.

In either case, the execution of the SQL statement is done by the target database's DBM. The DBM usually must first compile the statement (a process called preparing the statement) prior to executing it. Assuming the DBM supports statement reuse, the prepare step need only be done once (thereafter, additional statements with the same statement structure can re-use this access and execution plan as the statement data changes). As mentioned earlier, the prepare function can be a timely and resource-intensive function.

iii. Cached Statements

Note that the statement which is cached has no data associated with it. Rather, the location of the data is indicated by markers (or identifiers).

Using the previous example of an immediately executable statement, one representation of its statement text cached form could be:

INSERT INTO ACCOUNTTABLE (ACCTID, LASTNAME, FIRSTNAME, OPENDATE) VALUES (?,?,?,?)

where the question marks represent the location/position of the statement data item markers.

When processing statements and the associated statement data items in this form, note that more sophisticated and optimized database interface procedures (such as the Oracle Call interface for Oracle) can be used instead of the aforementioned "execute immediate" mode. Often, the verbose example shown above can be reduced even further into additional representations such that other statement features, such as the INSERT action above, can be represented by single, smaller tokens (rather than a 6-byte "INSERT" token).

iv. Hashing

If the replication function requires a large number of diverse SQL statements, the Extractor and Applier statement caches could become quite large. The time required to search these caches at some point will be significant.

Search time can be significantly reduced by using efficient searching techniques such as hashing algorithms. This well-known technique uses the character sequence of a statement to generate a key. Statements are then stored in order by their key.

Hash keys may not be unique. In this case, there may be two or more statements associated with the same hash key. There are certain algorithms, however, which guarantee unique keys.

When it is desired to see if a statement exists, its key is generated. The Extractor or Applier can then go directly into cache to see if that key exists, and if so if the statement in question exists.

v. Cache Depth Limitations

In some implementations, the size of the cache may not be sufficient to hold all of the SQL text statements after an extended period of operation. In this case, older statements may be flushed to disk and overwritten in memory by newer statements or by other statements that had been previously flushed. A common technique for managing the selection of which statement to flush is the least recently used (LRU) algorithm. Under this algorithm, the statement in the statement cache that has not been used for the longest period of time will be flushed and overwritten.

If the Extractor must overwrite a statement, then the next time that it sees that statement, it must treat it as a new statement. A statement identifier must be assigned, the statement text with its identifier must be inserted into the Extractor's cache, and the full statement text with change data must be sent to the Applier.

vi. User Exit Cache

In many implementations of replication engines, transformation and filtering of the change data may be done at specific points in the Extractor and/or the Applier (such as changing columns or adding or removing data). These are often done via user exits or a data mapping facility that invokes application-specific code.

In each of these cases, it is likely that the resulting changes will be represented by new SQL statements. At these points, a user-exit statement cache must be provided that works in the same way as previously described. For example, if an Applier-side user exit alters the statement structure, than the Applier assumes the task of caching the newly formed statements between it and the Extractor on the one side, and the database interface on the other.

D. Multi-Threading and Referential Integrity

In some replication engines, Extractors, communication channels, and/or Appliers may be multi-threaded to improve performance. Once this is done, there is no guarantee that changes will arrive at the DBM in the same order that they were applied to the source database unless a coordination or resynchronization/re-serialization step is done.

It is often important that changes be applied in natural flow order (see Chapter 10 in reference 1). That is, all related changes and transactions must be applied in the same order at the target database as they were at the source database. Otherwise, new changes might be overwritten by older changes, inter-row relations may be broken, and so on, thus compromising the referential integrity of the target database.

There are several methods for ensuring referential integrity in a data replication engine. They all require that a re-serialization facility be provided between the last (independently) multi-threaded component and the DBM. The role of the re-serialization facility is to order changes properly into natural flow order for the DBM.

The natural flow of changes can be guaranteed by holding a change until all previous changes have been received and applied.

In some cases, the natural flow of changes within a transaction is not important, and this requirement can be relaxed by enforcing only the natural flow of transactions. Maintaining the natural flow of transactions is more difficult. When multiple paths exist, it is first necessary to know when all changes for a transaction have been received. In a multi-threaded replicator, this can be done by having each thread send an end-transaction marker down the replication channel when it knows that all changes for a transaction have been sent. When the re-serialization point has received end-transaction markers for a given transaction from all threads that might have handled that transaction (or from all configured threads), then it is known that all changes for that transaction have been received. This particular method is known as expected ends (see reference 5).

Once a transaction has been completely received or has been received up to a particular synchronization point, then the re-serialization facility must be able to hold it until all prior transactions have been received and committed by the DBM. At that time, the transaction (or part thereof) is submitted to the DBM.

In the configuration shown in FIG. 3, when multiple paths exist it is up to the Applier to re-serialize transactions and, if necessary, changes within a transaction. If the Appliers are multi-threaded, then their commit activity must be controlled by a common re-serializer, or the Appliers must coordinate among themselves for re-serialization purposes.

E. Prepared Statement Caching

As noted above, the DBM will typically compile (or prepare) a statement prior to executing it.

In some cases, the DBM will cache the prepared statement, identifying it via a prepared statement id submitted to it by the Applier. Statement Caching will use this id to create a Prepare Map which maps the statement text id to the prepared statement id as shown in FIG. 4. It may be that the DBM can only cache a limited number of prepared statements. In this case, the replicator must manage this limit and decide which prepared id to overwrite—typically via a least recently used (LRU) algorithm as described earlier for managing Extractor and Applier caches.

Thereafter, when a statement is received, the map will be checked to see if this statement has already been prepared. If it has not yet been prepared, then the statement text is submitted to the DBM for preparation and an entry is made in the map when the DBM returns the id of the prepared statement. If the statement has been previously prepared, then only the prepared statement id and the change data need be sent to the DBM.

F. Caching with Database of Change (DOC) Store

A replication engine could provide a Database of Change (DOC) at the Applier (although it could also exist at the Extractor). The DOC can be a persistent store (or memory location) that is used for a variety of reasons including:

1. Recovery: If the Applier node fails, the cached statements and unapplied changes are not lost.

2. Re-serialization: The DOC can be used to store uncommitted changes and transactions to support their proper re-sequencing for target database updating.

3. Replay of only committed transactions: By storing all changes for a transaction until the transaction end state record arrives (commit or abort), the Applier can be configured to only replay committed transactions thus avoiding the issues associated with replaying aborted transactions.

A typical Applier DOC implementation is shown in FIG. 5. In this example, two DOC stores are provided, one for the SQL statement text for the SQL statements (the Text DOC), and one for the SQL statement data for the SQL statements (the Data DOC).

In FIG. 5, The Applier is shown separated into two processes—

1. The DOC Writer which reads changes sent by the Extractor over the communication channel, storing them into the DOC pair.

2. The Transaction Replay Server (TRS) which reads change statements from the DOC pair and applies them to the target database.

If the DOC Writers receive a complete SQL statement (containing both the statement text and the statement data), it will store its statement text and statement id in the Text DOC and will store the statement data (change data) along with its corresponding statement id in the Data DOC. It may also store the statement text in a memory-resident cache as a performance enhancement.

If the DOC Writer receives only statement data with a statement id, then that information is stored in the Data DOC.

The TRS may also maintain its own statement text cache as a performance enhancement. It will read changes from the Data DOC using the associated statement id to retrieve the statement text from the memory-resident statement cache if one is provided, or else from the Text DOC. TRS will assemble the change data into the statement text and submit it to the DBM for execution. The DBM will prepare the statement and update the target database.

If the DBM supports prepared statement caching, then before passing the statement to it for preparation and execution, the TRS will search its Prepare Map to see if this statement has already been prepared. If so, it can skip building the statement from the statement text as described above and it need only send the prepared statement id obtained from the map and the statement change data to the DBM.

If the statement text id is not found in the Prepare Map, then the TRS will submit the complete SQL statement to the DBM for preparation and execution, and will create a new entry in the Prepare Map for the prepare-id/statement-id pair.

It is typically up to the TRS to perform the re-serialization function for referential integrity if multi-threading is used. In some implementations, judicious use of DOC keys helps this process.

G. Static SQL Statements

In some applications, all forms of database changes are known in advance. In this case, the SQL statements can all be written in advance and compiled into the Applier. This is often referred to as static embedded SQL statements. For example, assuming all I/O to a table consists of INSERT statements where all columns are provided, the statement text never needs to be sent to the Extractor and never needs to be compiled by the Applier except once when the program is first prepared (usually at first use of the SQL statement in the program in a step often referred to as dynamic compiling).

When the Extractor reads a change from the Change Queue, it need send only the predetermined statement number with the statement change data to the Applier. The Applier can then send the statement change data with the prepared statement to the DBM, thus precluding the necessity to cache statement text and prepare statements.

A hybrid implementation would pre-compile known SQL statements as described above, and would cache new statements as previously described.

H. Blocking Changes

There are ample opportunities to block change data for more efficient processing:

1. Blocks of changes can be read from the Change Queue with a single read and then processed individually.

2. Processed changes with statement text or statement id's can be assembled into blocks for more efficient transmission across the communication channel.

3. Blocks of changes read from the communication channel can be processed individually, then assembled into blocks and written to the Text DOC (if necessary) and to the Data DOC as appropriate.

4. Blocks of changes can be read from the Data DOC and processed in serialized order.

5. If the DBM supports statement blocking, the changes can be batched and submitted to the DBM in blocks.

Blocking can be very effective by reducing delays due to Change Queue and DOC disk accesses by an order of magnitude or more, and can significantly improve the efficient utilization of the communication channel and DBM interface.

I. Blocking Transaction Events

When a block of changes is being prepared for writing to the Data DOC, all of the statement change events for a given transaction found in that block may be blocked into a single record along with their transaction id and transaction state. They can then be written to the Data DOC as a single record, and subsequently read from the Data DOC as a single record at the appropriate time to ensure updating the target database in natural flow order.

This is a further form of blocking that will increase the efficiency of writing to and reading from the Data DOC.

J. Transaction Forwarding Server (TFS)

It is sometimes required that a change event or a transaction received at one target node be forwarded to another target node. This is the role of the Transaction Forwarding Server (TFS) shown in FIG. 6.

The TFS acts similarly to an Extractor. It also maintains a statement cache. It retrieves a change from the statement Data DOC and checks to see if its associated statement is in the TFS's statement text cache. If it is, the statement change data and its statement id are sent to the remote node.

If the statement text is not in its cache, then the TFS must read the statement text from the Text DOC, store it in its statement cache, and assemble the SQL statement by inserting the change data. It then sends the entire SQL statement or representation thereof to the remote node.

K. Recovery

There are several configurations that support recovery from a node or network failure:

1. If the source node fails, the Extractor's statement cache will be lost unless it had safe-stored it on disk. If the cache is lost, then the Extractor must send every new statement in full to the Applier. The Applier's statement cache must now be replenished with the new statements and their id's, since the statement id's have changed, or be remapped appropriately. Alternatively, the Applier can search its cache for the new statement (such as by using a hashing algorithm) and simply change its statement id if it already exists in cache.

2. If the target node fails and it did not have a DOC, then the Extractor must ensure that any new statement not seen by the Applier is sent in full. It could do this by invalidating its own cache and resending all SQL statements as its cache is rebuilt, or by marking entries in its cache to note which entries have not yet been resent to the Applier.

3. If the target node has a DOC, then no recovery procedure is needed in the event of a target node failure. Changes are queued at the source system while the target node is down and sent to the target node upon its recovery as in the normal case.

4. In a similar manner, if the network fails, the Extractor will simply queue changes and send them to the Applier when the network connection has been put back into service.

L. Improvements Using Statement Caching

There are many benefits that accrue when using Statement Caching in a replication engine:

1. The text for a particular SQL statement need be sent only once to the Applier, thus significantly reducing the utilization of the network by the replication engine.

2. Once a statement has been sent, only the data for that statement along with a statement identifier need be sent thereafter.

3. Using block reads of the Change Queue, the read activity of the Change Queue can be significantly reduced.

4. Accumulating changes into blocks prior to transmission further reduces communication line utilization.

5. By caching statement text entries in the DOC Writer memory and the TRS memory, statement text DOC I/O is minimized to an insert by the DOC Writer when a new text statement arrives from the source system, and a read by the TRS process when a new text id is read from the Data DOC referencing a statement text that the TRS does not have in its cache.

6. Writing blocks of statement text to the Text DOC and reading blocks of statements from the Text DOC significantly reduces the utilization of the Text DOC disk.

7. Events written to and read from the Data DOC are smaller since they do not contain the statement text, thus speeding up the processing of change events. This also reduces the utilization of the Data DOC.

8. Events found in an incoming block of changes that are associated with one transaction can be written as a single record to the Data DOC, thus reducing write and read activity on the Data DOC.

9. If the DBM supports the reuse of prepared statements, Statement Caching can use these previously prepared and saved statements to minimize the DBM's prepare overhead.

10. Persistently storing the statement text and statement data cache information eliminates resending it if certain conditions occur like a replication engine restart. This can also lessen the amount of time the Change Queue data need to kept available at the source database.

III. References

1. Breaking the Availability Barrier; Survivable Systems for Enterprise Computing W. H. Highleyman, Paul J. Holenstein, Bruce D. Holenstein, "Breaking the Availability Barrier; Survivable Systems for Enterprise Computing," AuthorHouse; December, 2003

2. U.S. Pat. No. 6,122,630 (Strickler et al.) entitled: BiDirectional Database Replication Scheme for Controlling Ping Ponging.

3. U.S. Pat. No. 6,662,196 (Holenstein et al.) entitled: Collision Avoidance in Bidirectional Database Replication.

4. U.S. Pat. No. 6,745,209 (Holenstein et al.) entitled: Synchronization of Plural Databases in a Database Replication System.

5. U.S. Patent Application Publication No. 2005/0021567 (Holenstein et al.) entitled: Method for ensuring referential integrity in multi-threaded replication engines The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of processing statement text and statement data of a transaction in a process for replicating I/O operations of the transaction from a source database to a target database in a data replication system that includes (i) a change queue, and (ii) a replication engine for use in replicating the I/O operations from the source database to the target database, wherein a statement cache caches statement text associated with I/O operations to be replicated and a first memory location persistently stores statement text associated with I/O operations to be replicated, the method comprising:

(a) caching I/O operations of the transaction to be replicated in the statement cache by separating the I/O operations into:
(i) statement text, and
(ii) statement data;
(b) determining if the statement text has been previously stored in the first memory location;
(c) the data replication system replicating the statement text only if it is determined that the statement text is not previously stored in the first memory location, the data replication system thereby avoiding the need to re-replicate the statement text if the statement text has been previously stored in the first memory location;
(d) persistently storing the statement text associated with the replicated I/O operations in the first memory location whenever the statement text is replicated;
(e) storing the statement data and statement text in a change queue associated with the source database, wherein the I/O operations to be replicated are obtained from the change queue associated with the source database; and
(f) the replication engine obtaining I/O operations from the change queue associated with the source database.

2. The method of claim 1 further including a second memory location for persistently storing the statement data.

3. The method of claim 1 wherein the first memory location is on disk.

4. The method of claim 1 wherein the first memory location is at the target database.

5. An apparatus for processing statement text and statement data of a transaction in a process for replicating I/O operations of the transaction from a source database to a target database in a data replication system that includes (i) a change queue, and (ii) a replication engine for use in replicating the I/O operations from the source database to the target database, wherein a statement cache caches statement text associated with I/O operations to be replicated and a first memory location persistently stores statement text associated with I/O operations to be replicated, the apparatus comprising:

(a) means for caching I/O operations of the transaction to be replicated in the statement cache by separating the I/O operations into:
  (i) statement text, and
  (ii) statement data;
(b) a data replication system that replicates the statement text only if it is determined that the statement text is not previously stored in the first memory location, the data replication system thereby avoiding the need to re-replicate the statement text if the statement text has been previously stored in the first memory location;
(c) means for persistently storing the statement text associated with the replicated I/O operations in the first memory whenever the statement text is replicated;
(d) means for storing the statement data and statement text in a change queue associated with the source database, wherein the I/O operations to be replicated are obtained from the change queue associated with the source database; and
(e) means for the replication engine to obtain I/O operations from the change queue associated with the source database.

6. The apparatus of claim 5 further including a second memory location for persistently storing the statement data.

7. The apparatus of claim 5 wherein the first memory location is on disk.

8. The apparatus of claim 5 wherein the first memory location is at the target database.

9. The method of claim 1 further comprising:
(g) assigning a statement identifier to statement text, wherein the statement identifier is used in place of the statement text.

10. The apparatus of claim 5 further comprising:
(g) means for assigning a statement identifier to statement text, wherein the statement identifier is used in place of the statement text.

11. The method of claim 2 wherein the second memory location is on disk.

12. The method of claim 2 wherein the second memory location is at the target database.

13. The apparatus of claim 6 wherein the second memory location is on disk.

14. The apparatus of claim 6 wherein the second memory location is at the target database.

* * * * *